US012529950B2

(12) United States Patent
Karamanoukian

(10) Patent No.: US 12,529,950 B2
(45) Date of Patent: Jan. 20, 2026

(54) SIMULATOR PROJECTION SYSTEM

(71) Applicant: SKYEVU IMAGES INC., Laval (CA)

(72) Inventor: Shawn Karamanoukian, Laval (CA)

(73) Assignee: SKYEVU IMAGES INC., Laval (CA)

( * ) Notice: Subject to any disclaimer, the term of this patent is extended or adjusted under 35 U.S.C. 154(b) by 475 days.

(21) Appl. No.: 18/001,540

(22) PCT Filed: Jun. 11, 2021

(86) PCT No.: PCT/CA2021/050799
§ 371 (c)(1),
(2) Date: Dec. 12, 2022

(87) PCT Pub. No.: WO2021/248250
PCT Pub. Date: Dec. 16, 2021

(65) Prior Publication Data
US 2023/0350282 A1    Nov. 2, 2023

Related U.S. Application Data

(60) Provisional application No. 63/038,145, filed on Jun. 12, 2020.

(51) Int. Cl.
*G03B 21/60* (2014.01)
*G09G 3/00* (2006.01)
(Continued)

(52) U.S. Cl.
CPC ............. *G03B 21/60* (2013.01); *G09G 3/003* (2013.01); *H10K 59/878* (2023.02); *H10K 2102/311* (2023.02)

(58) Field of Classification Search
CPC .......... G09G 3/003; G09G 3/035; G09G 3/32; G09G 3/2003; G09G 5/12; G09G 5/14; G09G 5/16; H10K 59/877; H10K 59/878; H10K 59/8791; G03B 21/56; G03B 21/60; G03B 21/562; G03B 21/565; G03B 21/567
See application file for complete search history.

(56) References Cited

U.S. PATENT DOCUMENTS 10,663,724 B1 * 5/2020 Laduke ................ G03B 35/20
2005/0041219 A1   2/2005 Streid et al.
(Continued)

FOREIGN PATENT DOCUMENTS

CN    207134083 A    3/2018
CN    109036158 A   12/2018
(Continued)

OTHER PUBLICATIONS

International Search Report of corresponding International PCT Application No. PCT/CA2021/050799.

*Primary Examiner* — Sultan Chowdhury
(74) *Attorney, Agent, or Firm* — Lavery, de Billy, L.L.P.; Benoit Yelle

(57) ABSTRACT

A simulator projection system and simulator comprising a projector is disclosed. The projector comprises a plurality of segments each comprising a plurality of light emitting elements arranged on a support surface to form either a spherical, conical or cylindrical projection surface which is reflected by a collimating reflector for viewing by an operator.

16 Claims, 15 Drawing Sheets

(51) Int. Cl.
*H10K 59/80* (2023.01)
*H10K 102/00* (2023.01)

(56) References Cited

U.S. PATENT DOCUMENTS

| | | | |
|---|---|---|---|
| 2008/0206720 A1* | 8/2008 | Nelson | G09B 9/165 |
| | | | 434/44 |
| 2010/0097304 A1 | 4/2010 | Vidal et al. | |
| 2010/0123880 A1 | 5/2010 | Oren | |
| 2017/0206799 A1* | 7/2017 | Bell | H04N 9/3164 |
| 2021/0286176 A1* | 9/2021 | De Meerleer | G03B 21/10 |

FOREIGN PATENT DOCUMENTS

| | | |
|---|---|---|
| WO | 2011110797 A1 | 9/2011 |
| WO | 2012150470 A1 | 11/2012 |
| WO | 2018161163 A1 | 9/2018 |
| WO | 2020020910 A1 | 1/2020 |

* cited by examiner

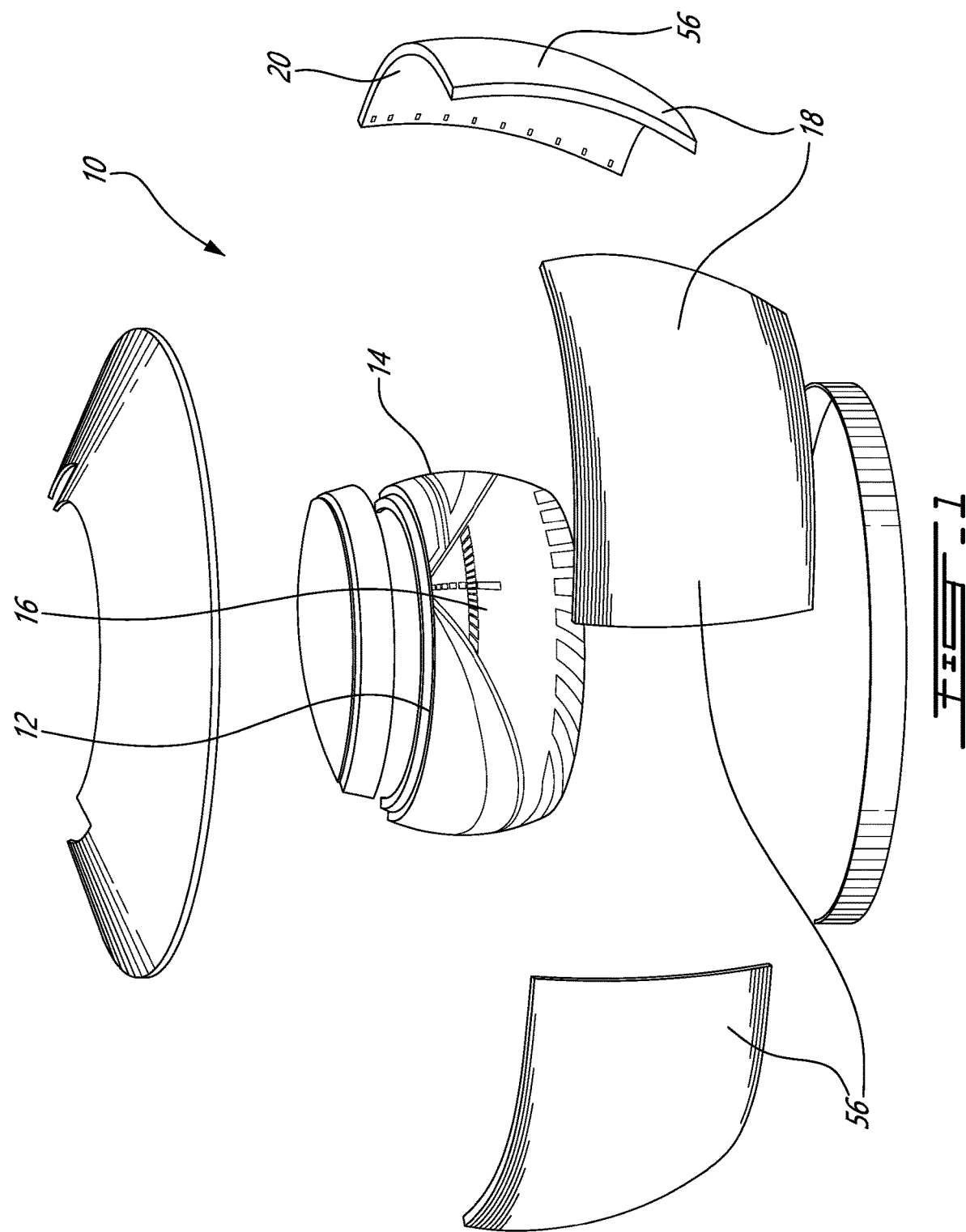

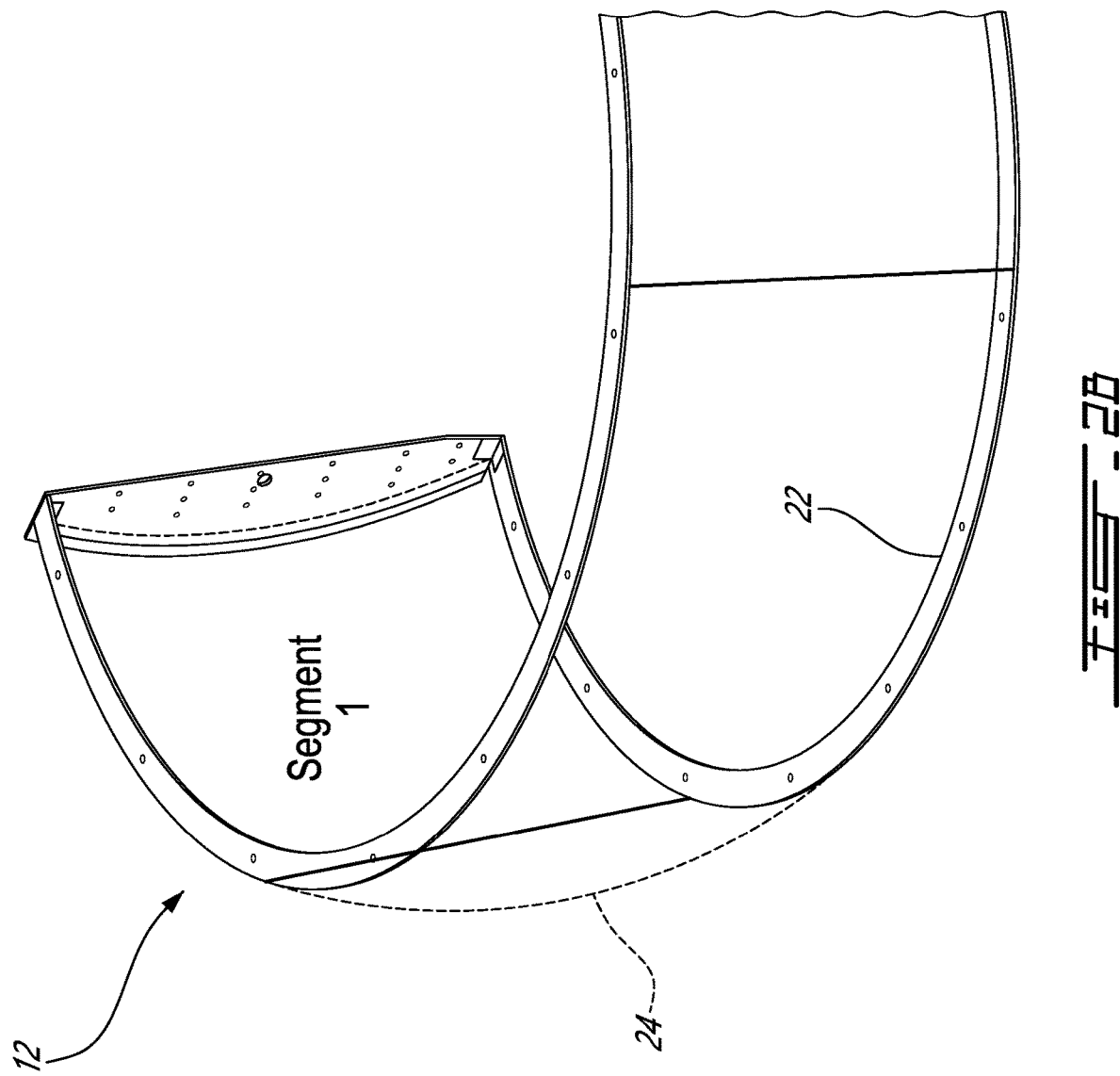

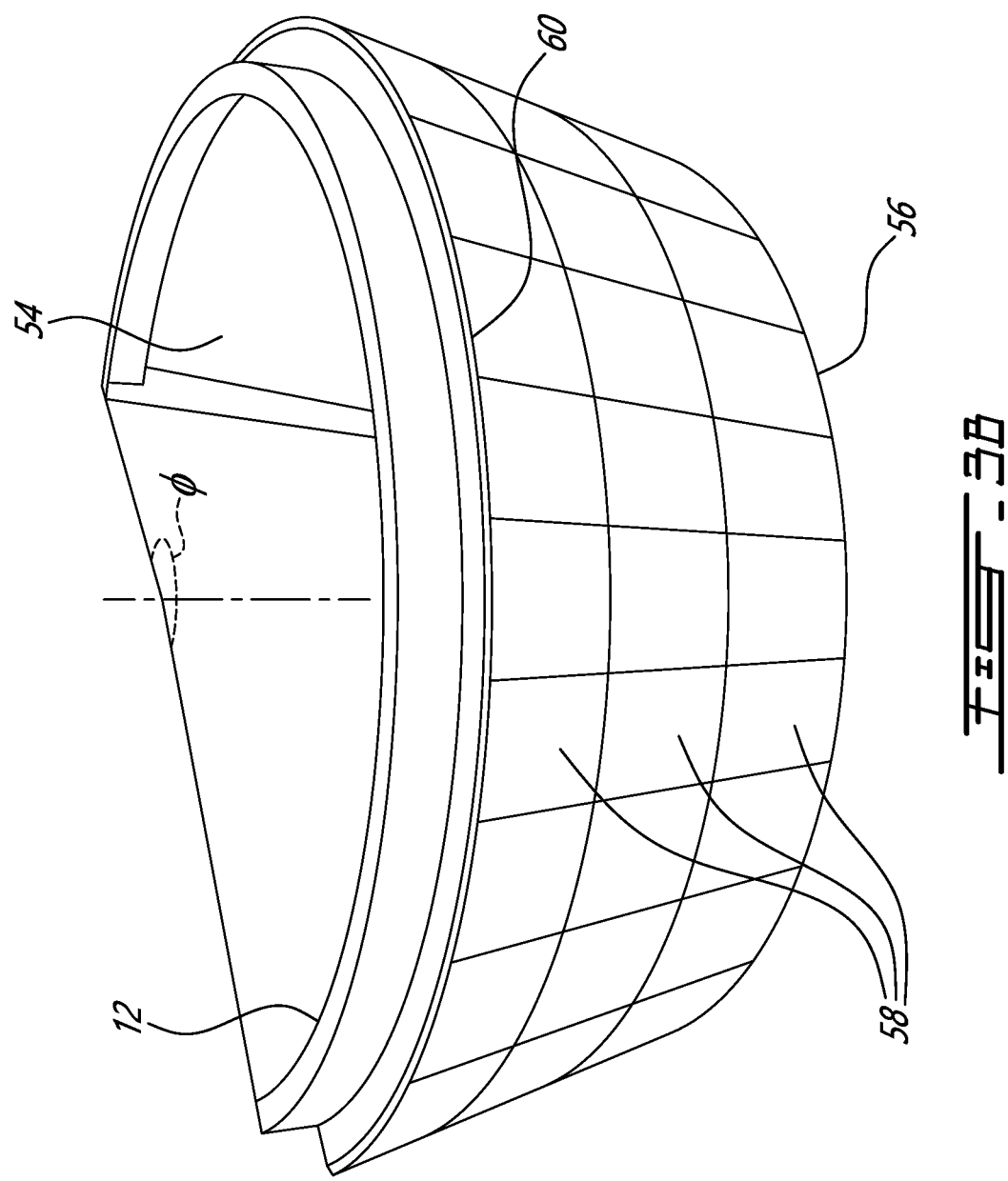

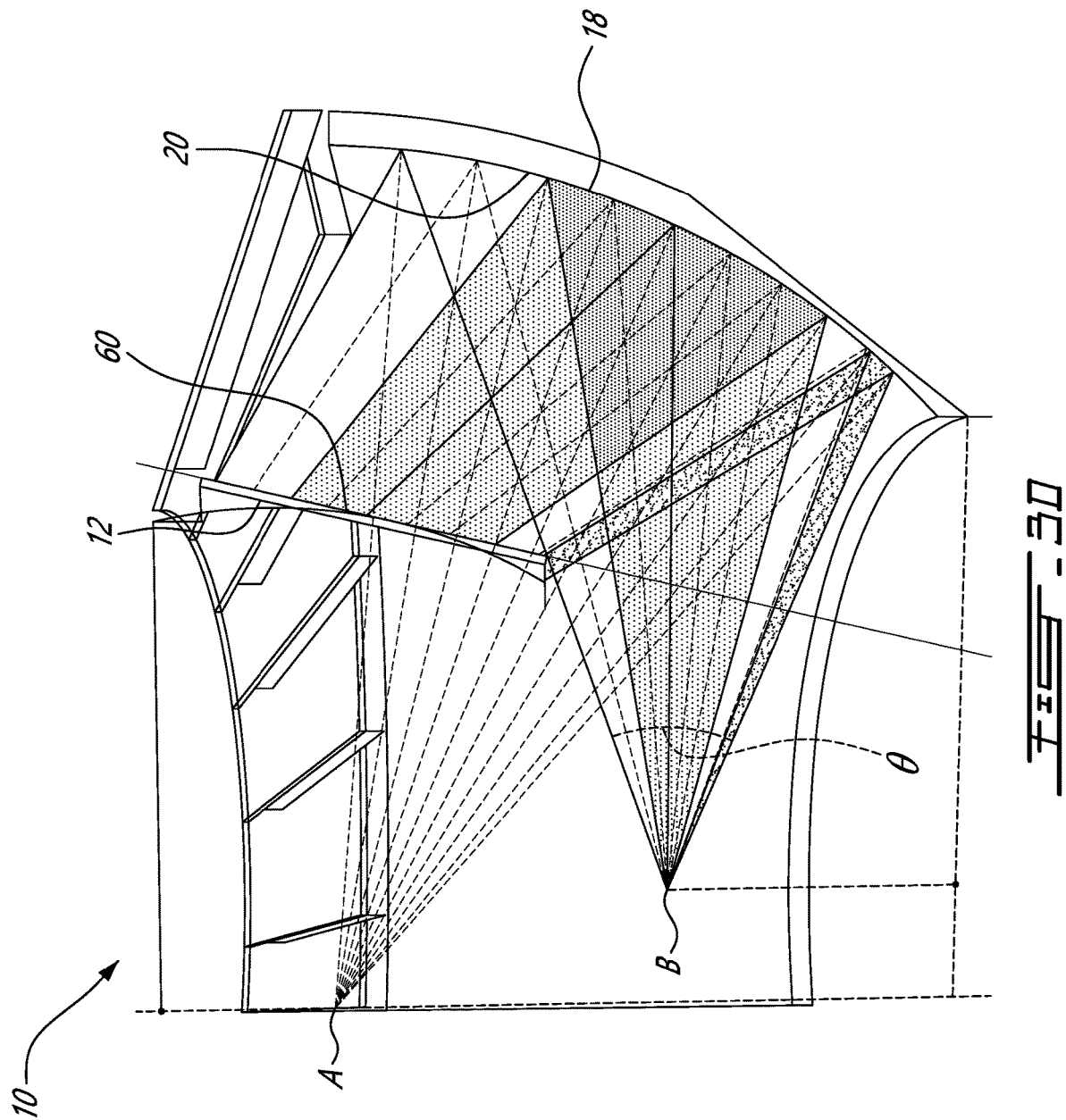

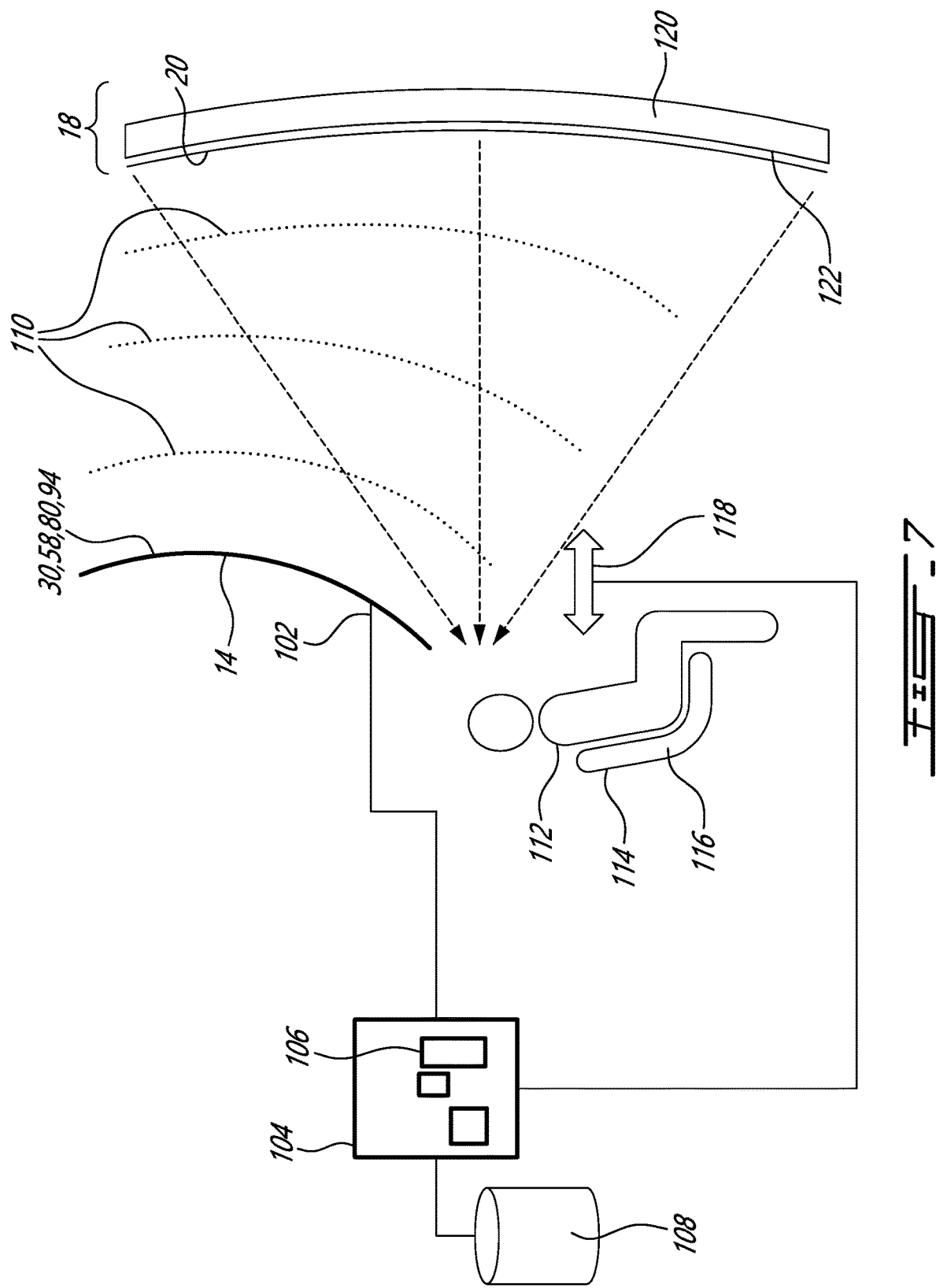

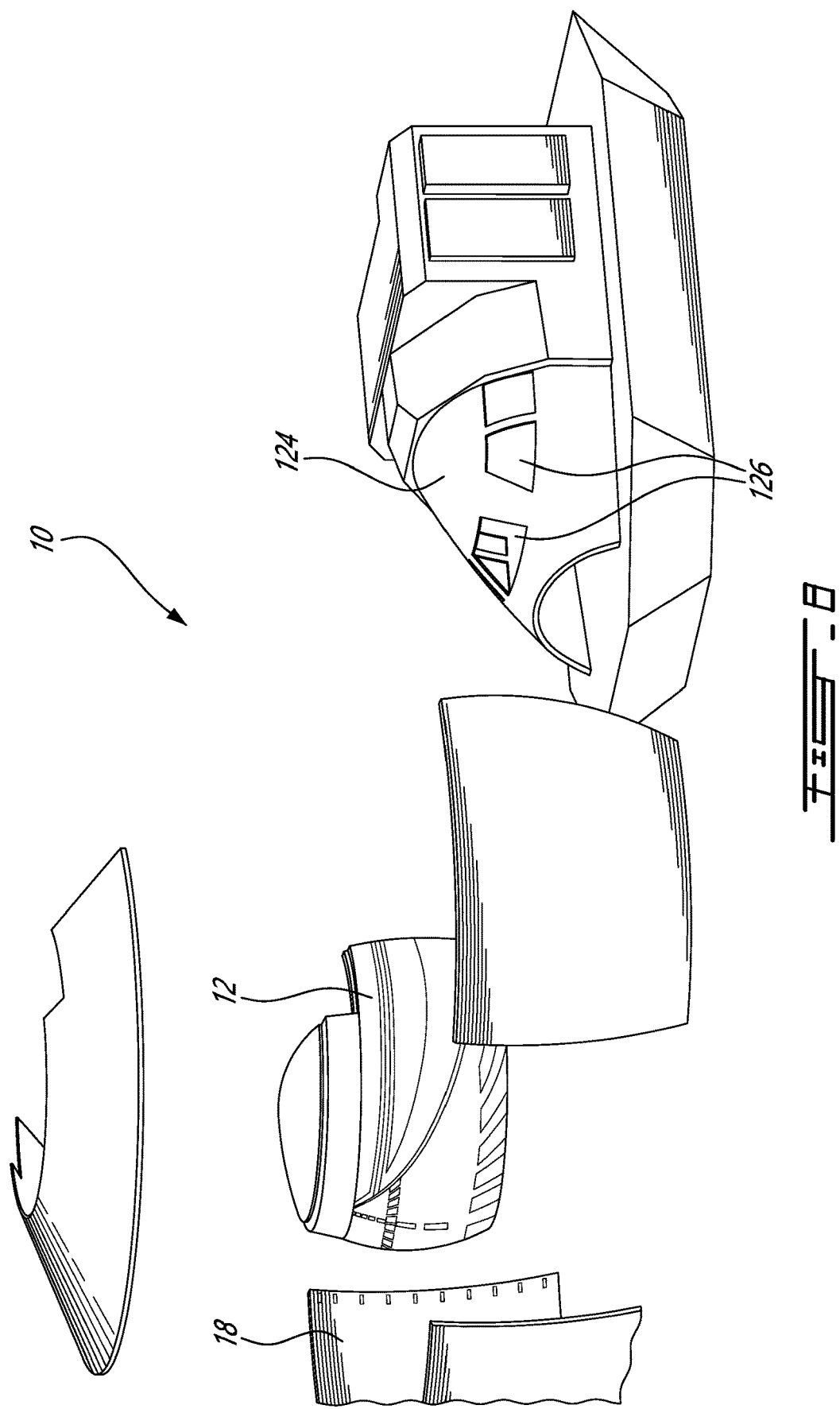

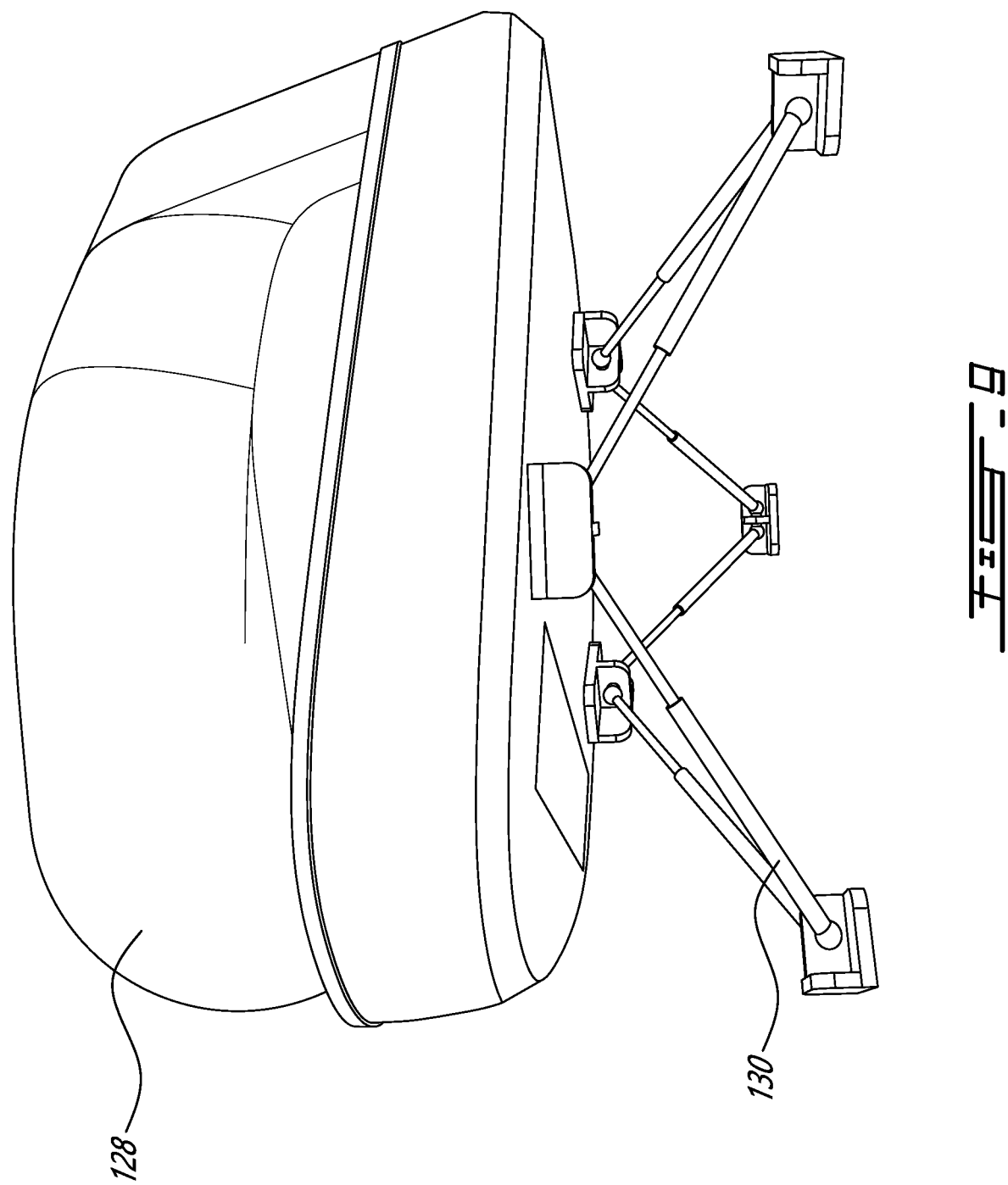

SIMULATOR PROJECTION SYSTEM

FIELD OF THE INVENTION

The present invention relates to a simulator projection system. In particular, the present invention relates to a simulator projection system for use in a simulator and comprising a flexible convex projection surface.

BACKGROUND TO THE INVENTION

The prior art discloses simulators comprising a plurality of projectors that project an image through typically a plurality of lenses onto a back projection screen which is subsequently reflected in a collimating mirror for viewing by a user of the simulator. One drawback of such prior art designs is that there typically a plurality of projectors are required to render the relatively wide horizontal field of view, typically over 180°, which is required by a simulator system to achieve a realistic effect. The multiple projectors must frequently be aligned by a trained technician to ensure a comparatively seamless image over 180+°. Additionally, the intensity of the image projected on the back projection screen typically varies form a higher intensity towards the center to a lower intensity towards the periphery as well as portions of the image where images projected by different projectors overlap. Furthermore, the level of contrast and brightness achievable using a back projection screen leads to unrealistic effects and substandard simulation, for example due to low daylight brightness (typically about 6 ft lamberts), low contrast ratio (typically about 8000:1), significant black level (0.004 ft lamberts) as well as poor resolution and smearing due to response times of 5 to 10 milliseconds.

What is needed therefore, and one object of the present invention, is a visual system for a simulator which provides for improved performance and/or lower maintenance.

SUMMARY OF THE INVENTION

In order to address the above and other drawbacks there is provided a projector system for use in a simulator comprising an operator position comprising a chair and at least one controller and an image generator for generating a view of a simulated space from a selected one of a plurality of virtual locations within the simulated space and wherein the selected virtual location is selectable by an operator using the at least one controller. The projector system comprises a flexible display comprising a plurality of light emitting elements arranged conforming to a curved surface to form a curved projector surface, and a collimating reflector comprising a smooth concave mirrored surface. The mirrored surface is positionable relative to the projection surface and the operator such that when the view of the simulated space is rendered on the projector surface and reflected by the mirrored surface, the reflected rendered view is visible by the operator and the operator's perception of an operator position in the simulated space is as if the operator position was at the selected location.

Additionally, there is provided a system for simulating the operation of a vehicle by an operator in a simulated space, comprising an operator position comprising a chair and at least one controller, an image generator for generating a view of the simulated space from a selected one of a plurality of virtual locations within the simulated space, wherein the selected virtual location is selectable by the operator using the at least one controller, a projector comprising a flexible display conforming to a curved outer surface to form a curved projector surface, and a collimating reflector comprising a smooth concave mirrored surface. The convex projector surface is positioned relative to the mirrored surface and the projection surface is positioned relative to the operator position such that when the view of the simulated space is rendered on the projector surface and reflected by the mirrored surface, the reflected rendered view is visible by the operator when seated in the operator position and the operator's perception of an operator position in the simulated space is as if the operator position was at the selected location.

There is also provided a method of projecting an image representing a view of a simulated space for viewing by an operator seated at an operator position comprising at least one controller, comprising arranging a flexible display comprising a plurality of light emitting elements arranged conforming to an outwardly curved projector surface, positioning a collimating reflector comprising a concave mirrored surface relative to the curved projector surface such that the image when rendered on the curved projector surface is visible to the operator when located at the operator position, generating a view of the simulated space from a selected one of a plurality of virtual locations within the simulated space wherein the selected virtual location is selectable by the operator using the at least one controller, and rendering the view on the outwardly curved projector surface. The operator's perception of an operator position in the simulated space is as if the operator position was at the selected virtual location.

BRIEF DESCRIPTION OF THE DRAWINGS

FIG. 1 provides a raised left front exploded perspective view of a simulator comprising a simulator projection system in accordance with an illustrative embodiment of the present invention;

FIG. 2B provides a raised right front partial perspective view of a projector in accordance with a first illustrative embodiment of the present invention;

FIG. 3B provides a raised front left perspective view of a projector for a simulator projection system in accordance with a second illustrative embodiment of the present invention;

FIG. 3D provides a sectional view along IIID-IIID in FIG. 3A;

FIG. 7 provides a schematic diagram of a simulator comprising a simulator projection system in accordance with an illustrative embodiment of the present invention;

FIG. 8 provides a right front exploded perspective view of a simulator comprising a simulator projection system in accordance with an illustrative embodiment of the present invention; and FIG. 9 provides a right front perspective view of a simulator housing and parallel manipulator in accordance with an illustrative embodiment of the present invention.

DETAILED DESCRIPTION OF THE ILLUSTRATIVE EMBODIMENTS

Figure 2A:
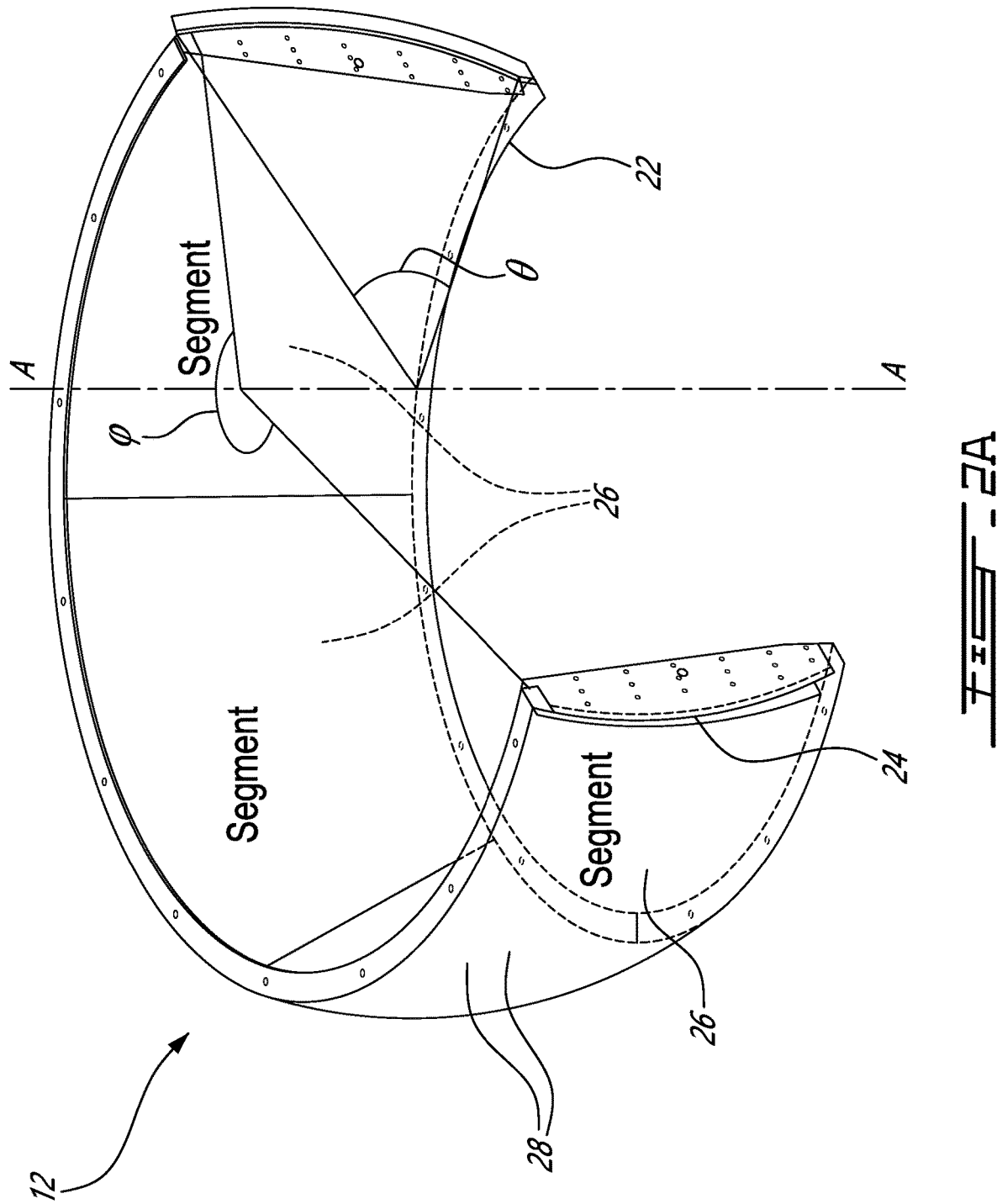
FIG. 2A provides a raised left rear perspective view of a projector in accordance with a first illustrative embodiment of the present invention.

Referring now to FIG. 1, a simulator projection system, generally referred to using the reference numeral 10, will now be described. The projection system 10 comprises a projector 12 having a projection surface 14 on which is rendered a moving image 16. A collimating reflector 18 comprising a smooth concave mirrored surface 20 is also provided which reflects and collimates the moving image 16 rendered on the projection surface 14 and such that it can be viewed by an operator who is at an operator position (both not shown). One benefit of using a collimating reflector 18 versus a direct display is that parallax can be achieved which improves realism, especially in cases with operators seated side by side and the like. As will be discussed in more detail below, the optical architecture of the projection system 10 is off axis, and as such the projector 12 is angled downwards such that the projector 12 aligns with the optical path.

Figure 2C:
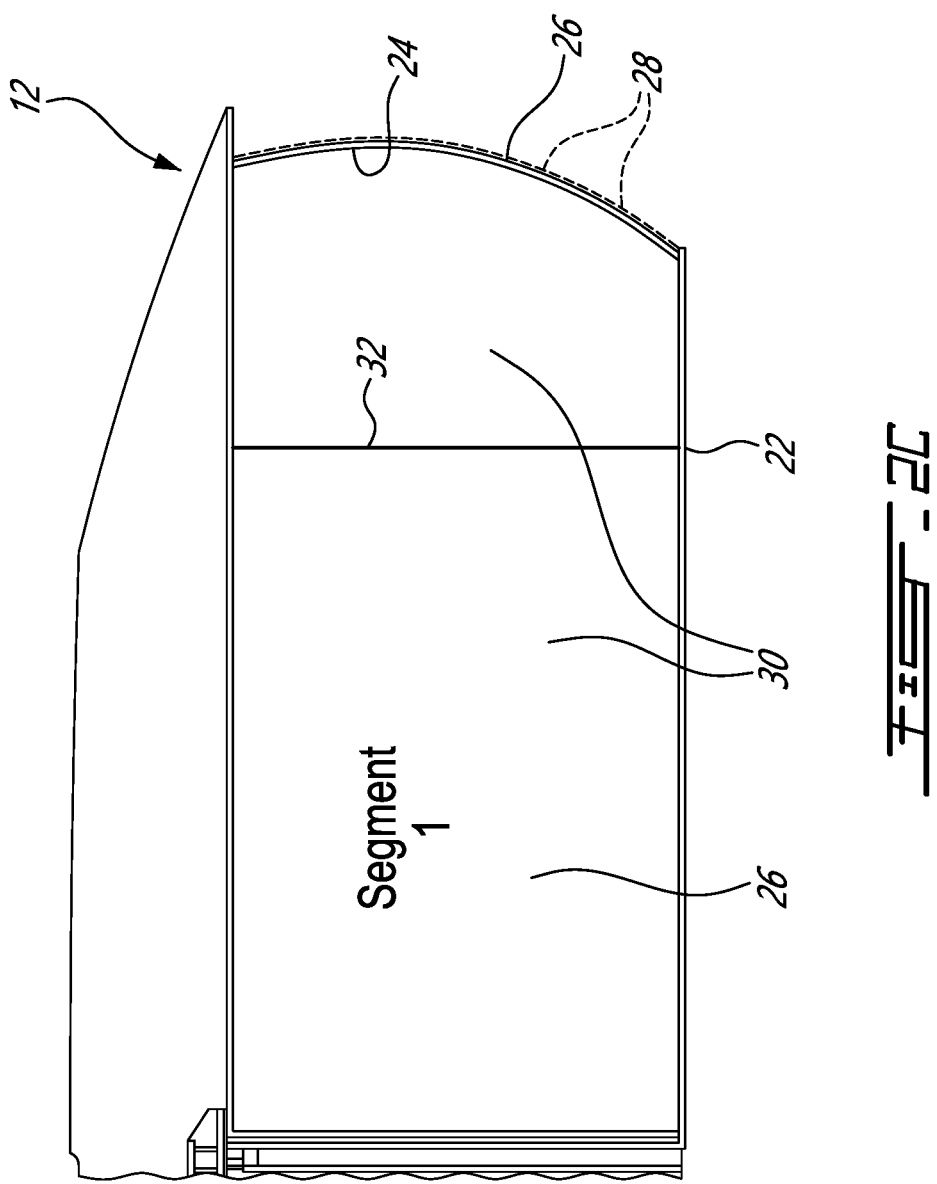
FIG. 2C provides a side plan view of a projector in accordance with a first illustrative embodiment of the present invention.

Referring now to FIGS. 2A, 2B and 2C in addition to FIG. 1, in a first embodiment the projector 12 comprises a projector support or form 22, illustratively fabricated from a ferrous metal such as sheet steel or the like or a composite material such as glass fiber or carbon fiber in a polymer matrix or the like, comprising a smooth convex outer surface 24 onto which one or more thin flexible segmented substrate 26, each comprising an array of light emitting elements 28 such as Organic Light Emitting Diodes (OLEDs), are mounted.

Still referring to FIGS. 2A, 2B and 2C, the flexible segmented substrate 26 is secured to the smooth convex outer surface 24 using magnets and clips or an adhesive, such as a removeable adhesive, or the like (all not shown) and positioned such that the short ends of adjacent ones of the segments are touching. Illustratively, three (3) segments 30 within one (1) continuous wide flexible substrate 26 provide for a projector 12 having a large convex surface of 52 inches in height and 18 feet in width. Adjacent segments 30 of the substrate 26 are positioned such that a gap 32 between segments is the same as the gap between adjacent light emitting elements 28, illustratively 0.03 mm, and such that no visible vertical gap is seen within the complete image rendered on the three segments 30 of the substrate 26.

Still referring to FIGS. 2A, 2B and 2C, in the first illustrative embodiment the convex surface is spherical around a central axis A spanning an angle φ of circa 220° field of view horizontally and an angle Θ of circa 43° field of view vertically. Additionally, each segment within the continuous wide substrate 26 wherein the light emitting elements 28 are OLEDs is illustratively capable of delivering a 4K resolution comprising 3840×2160 pixels, for a total 12K resolution for the continuous wide substrate 26. In addition to the total 12K resolution, the substrate 26 when adhered to the spherical form 22 is illustratively able to provide a day light brightness of at least about 60 ft lamberts), a high contrast ratio of at least about 1,000,000 to 1, a true Black level, i.e. zero back light as well as a response time of less than 0.1 milliseconds (and such that there is no visible smearing).

Figure 3A:
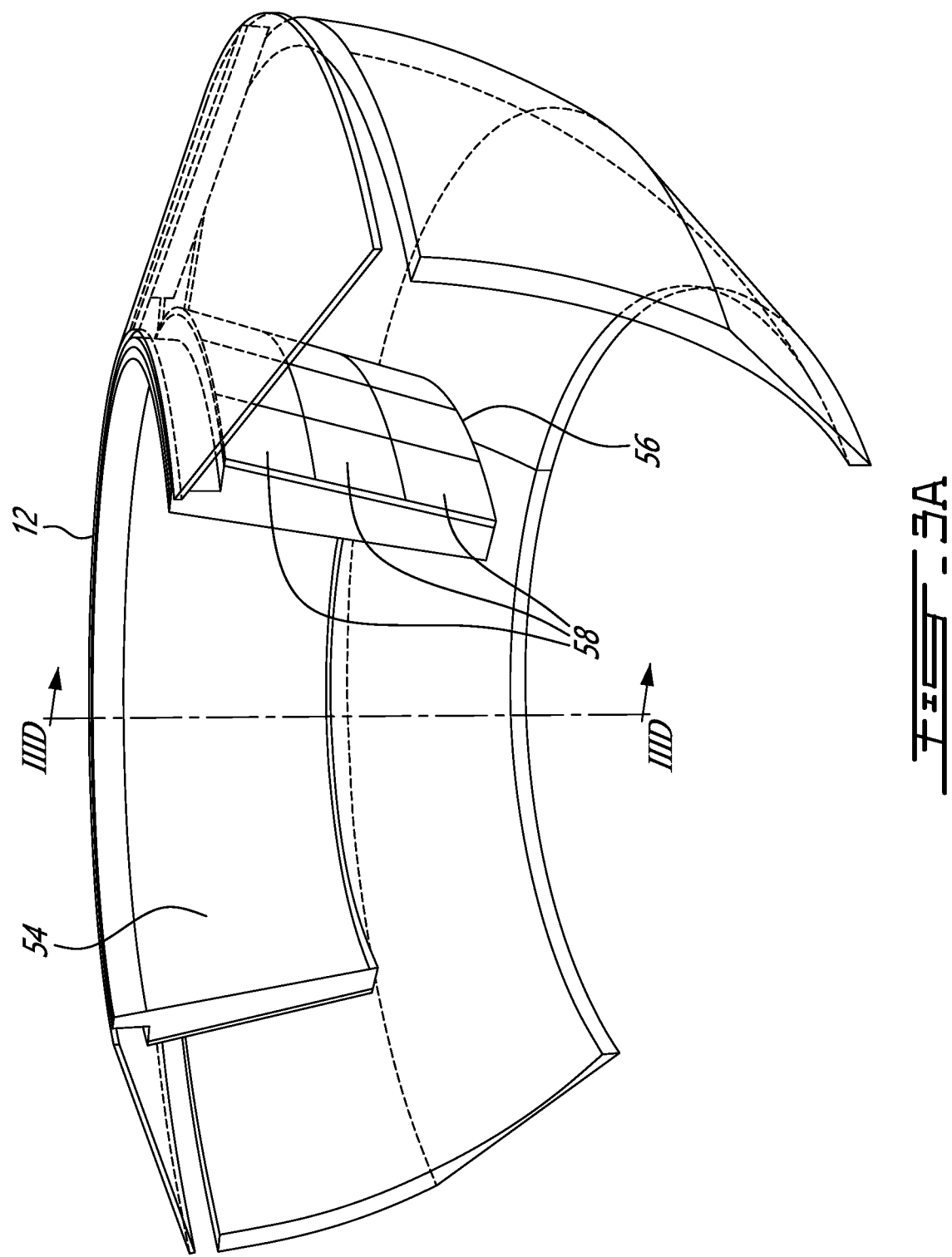
FIG. 3A provides a raised rear right perspective view of a projection system in accordance with a second illustrative embodiment of the present invention.

Referring now to FIGS. 3A and 3B in a second illustrative embodiment the projector 12 comprises a projector support or form 54, illustratively fabricated from a ferrous metal such as sheet steel or the like or a composite material such as glass fiber or carbon fiber in a polymer matrix or the like, comprising a smooth frustoconical outer surface 56 onto which a plurality of flexible segments 58 are tiled to form a partial frustoconical projection surface 60. The frustoconical projection surface 60 spans an angle φ of circa 220° field of view. When installed as part of the projection system 10 the frustoconical projection surface 60 is inverted such that the apex of the cone the surface of which the frustoconical projection surface 60 accords to is pointing downwards. Illustratively, the cone the surface of which the frustoconical projection surface 60 accords to an angle of 12.5 degrees from vertical.

Figure 4B:
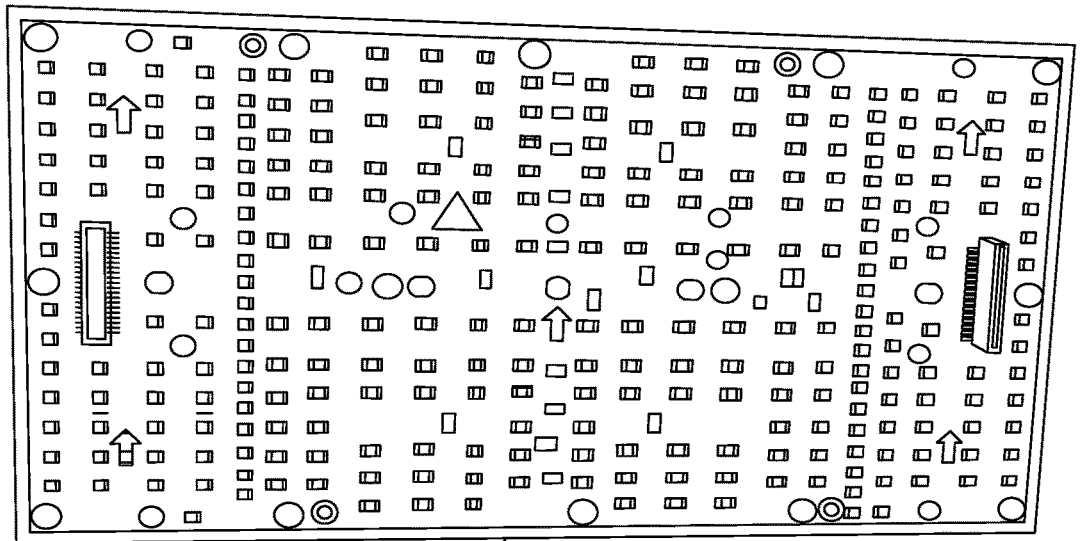
FIGS. 4A and 4B provide respectively a front plan view and a rear plan view of a flexible segment for use with a projector in accordance with an illustrative embodiment of the present invention.
Figure 4A:
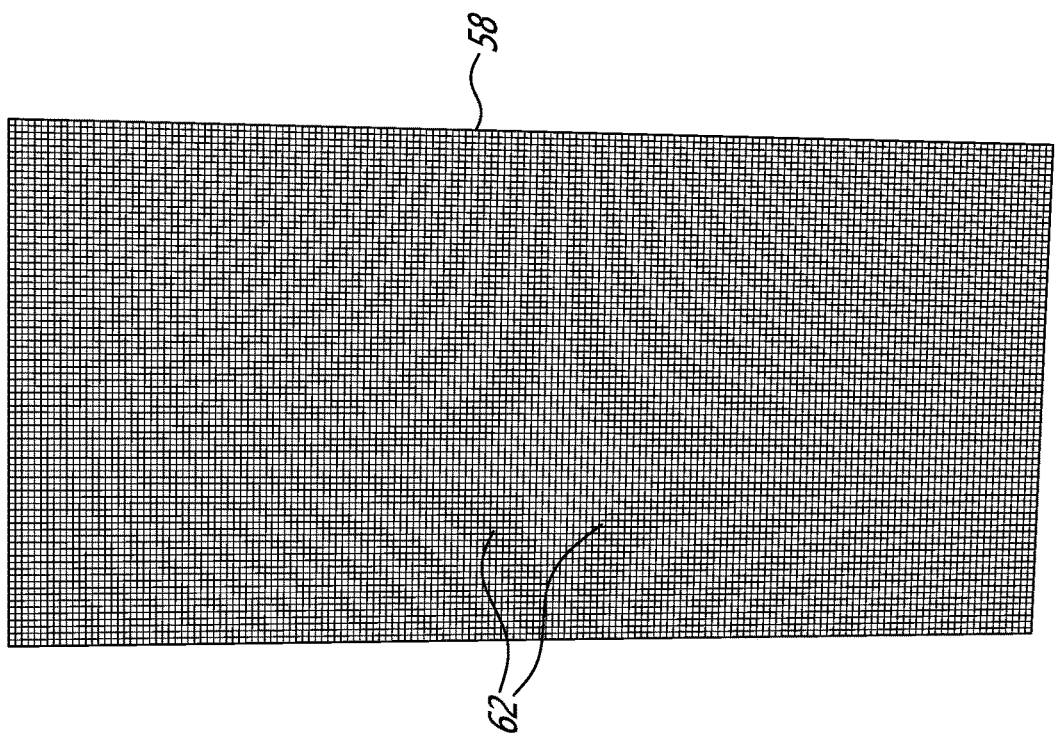

Referring now to FIG. 4A in addition to 3A and 3B, each flexible segment 58 of the conical projection surface 60 comprises an array of light emitting elements 62, or pixels, such as Organic Light Emitting Diodes (OLEDs), are mounted. In an embodiment the pitch of the light emitting elements 62 is less than or equal to 1 mm. Referring to FIG. 4B, the reversed side of each segment 58 comprises electronics 64 for powering the array of light emitting elements 62 as well as features such as magnets 66 or clips (not shown) or the like, for releasably mounting the segment to a surface. Illustratively, ribbon cables or the like (not shown) are used to interconnect each of the segments 58 with the image generation system (also not shown).

Figure 3C:
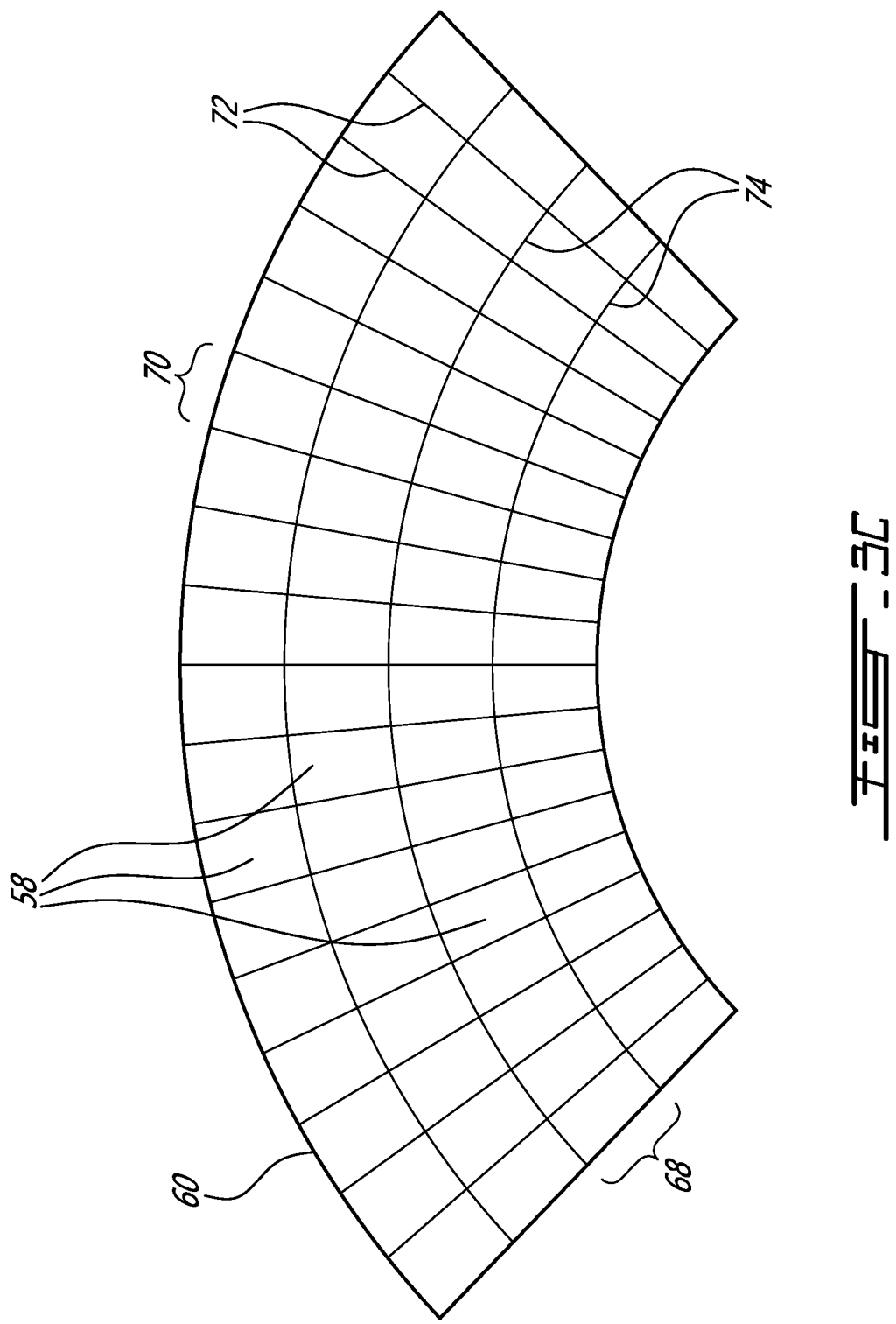
FIG. 3C provides a plan view of a segment layout for a projector in accordance with a second illustrative embodiment of the present invention.

Referring now to FIG. 3C in addition to FIGS. 3A and 3B, in order to form the frustoconical projection surface 60, the segments 58 are laid out in a plurality of rows 68 and columns 70. Each of the segments 58 of a given row 66 are of the same size and shape. Selection of a small enough segment size vis-a-vis the projection surface 60 allows illustratively for the use a segment 58 having a trapezoid shape with straight long edges 72 and short edges 74 without loss of resolution. When the segments 58 are attached to the support 54 comprising the conical outer surface 56 the resultant projection surface 60 is formed. In a particular embodiment the short edges 74 of the segments 58 can be slightly curved to snugly fit with adjacent segments of different sizes in the same column 70.

Still referring to FIG. 3C, in an illustrative embodiment the projection surface 60 using segments 58 comprising light emitting elements 62 having a 0.9 mm pitch comprises at least 59 columns and at least 5 rows of segments. All segments in all rows illustratively have a long edge dimension of 240 mm. Segments 58 in the top row have an upper short edge of 120 mm and a lower short edge of 116.93, 59 of which combine to provide an upper row of 7866 light emitting elements 62. Upper short edge dimensions of the segments 58 of the second to fifth (bottom) rows are respectively 116.93 mm, 115.86 mm, 110.79 mm and 107.73 mm. Similarly, lower short edge dimensions of the segments 58 of the second to fifth rows are respectively 115.86 mm, 110.79 mm, 107.73 mm and 104.66 mm and such that when assembled the segments 58 of adjacent rows 66 match. As discussed above, segments 58 in the bottom row have a lower short edge of 104.66 mm 59 of which combine to provide a bottom row of 6861 light emitting elements 62. The resultant projection surface 60 has an overall width (arc length over 220 degrees) of circa 7.08 metres (23' 2¾") at the upper edge and circa 6.175 metres (20' 3") at the lower edge, a height of circa 1.2 metres (3' 11¼") and an inverted frustoconical shape having a lower radius of circa 1.625 metres (5' 4") and an upper radius of circa 1.9 metres (6' 2½").

Referring to FIG. 3D, as discussed above, the optical architecture of the projection system 10 is off-axis, and as such the projector 12 is angled downwards such that the projector 12 aligns with the optical path. In this regard, the inverted frustoconical shape of the projection surface 60 of the second embodiment provides the requisite downwards angle while at the same time remains circular around a vertical axis. The projection surface 60 is positioned relative to the collimating reflector 18 such that the distance between a given light emitting element 62 and the mirrored surface 20 of the collimating reflector 18 is less than half of the distance between the mirrored surface 20 and its center of curvature A. As a result, each row of light emitting elements 62 matches the spherical profile of the mirrored surface 20 of the collimating reflector 18 and is substantially free of distortion. As will now be understood by a person of ordinary skill in the art, each row of light emitting elements 62 of the inverted frustoconical projection surface 60 has progressively decreasing radius from top to bottom and as a result, given the constant pitch of the light emitting elements 64, less light emitting elements 64. Hence, the image generator (not shown) that provides visual content adjusts the projected image accordingly, such that the final virtual image will appear rectilinear.

Still referring to FIG. 3D, in an alternative embodiment segments 58 of different rows 66 could be provided comprising light emitting elements 62 of different pitches, for example with a progressively smaller pitch for those segments on lower rows 66. Alternatively, the pitch of light emitting elements 62 on a given segment 58 could be progressively smaller from top to bottom and for example such that a constant number of light emitting elements 62 is maintained for each row of the resultant inverted frustoconical projection surface 60.

Still referring to FIG. 3D, an operator positioned at B is provided with a field of view Θ of nominally 43 degrees in a vertical direction and, as discussed above, a 220 degree field of view in a horizontal direction (not shown). Additionally, in order to maintain at least a minimum resolution of 2 arc minute angular object size the projector 12 should comprise a minimum of 6600 light emitting elements 62 in a horizontal direction and 1410 light emitting elements 62 in a vertical direction.

Figure 5A:
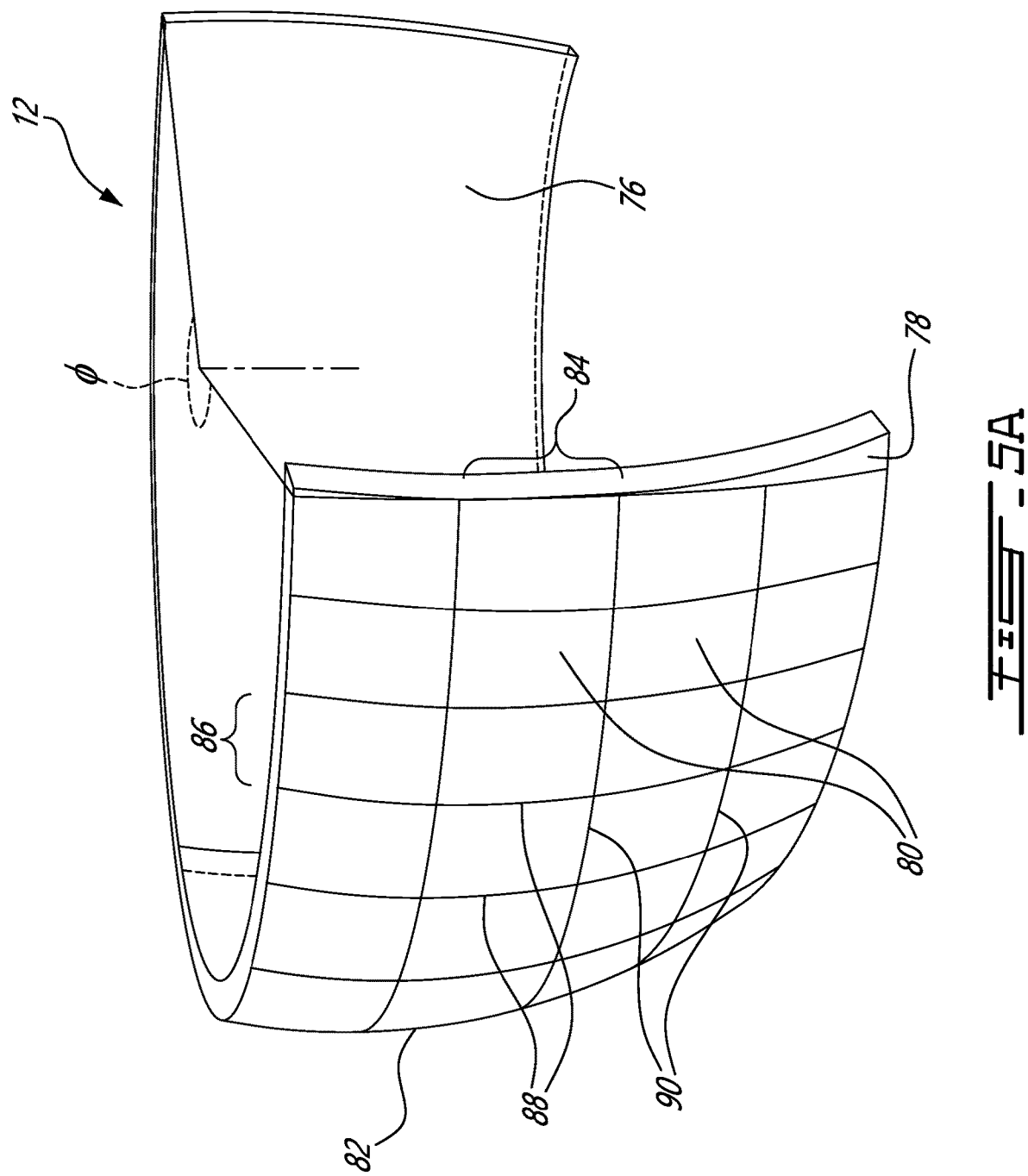
FIG. 5A provides a raised left right perspective view of a projector for a simulator projection system in accordance with a third illustrative embodiment of the present invention.

Referring now to FIG. 5A, in a third illustrative embodiment the projector 12 comprises a projector support or form 76, illustratively fabricated from a ferrous metal such as sheet steel or the like or a composite material such as glass fiber or carbon fiber in a polymer matrix or the like, comprising a smooth convex outer surface 78 onto which a plurality of flexible segments 80 are tiled to form a convex projection surface 82. The convex projection surface 82 spans an angle φ of circa 220° field of view and an angle of circa 43° field of view vertically.

Figure 5B:
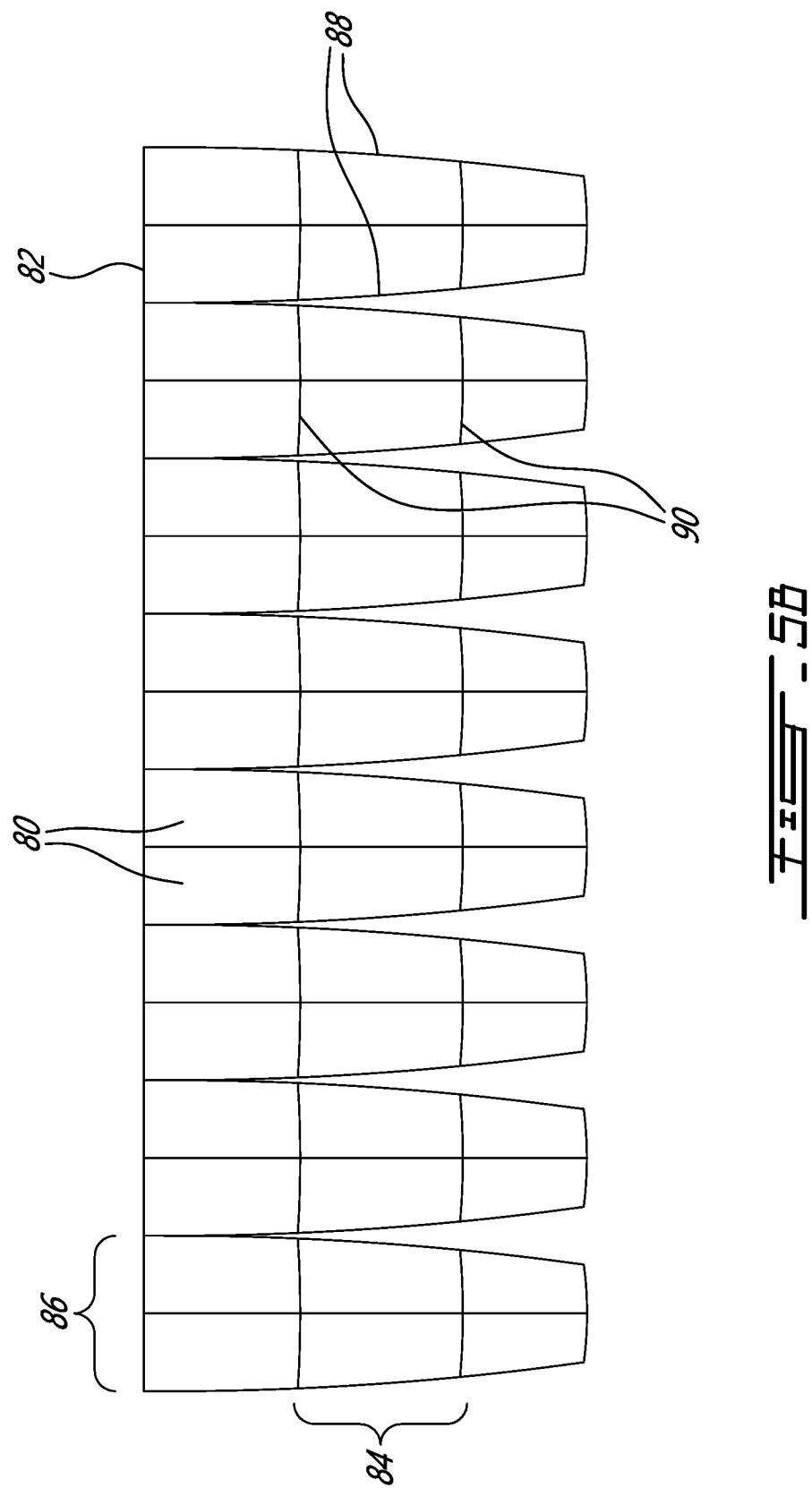
FIG. 5B provides a plan view of a segment layout for a projector in accordance with a second illustrative embodiment of the present invention.

Referring now to FIG. 5B in addition to FIG. 5A, in order to form the convex projection surface 82, the segments 80 are laid out in a plurality of rows 84 and columns 86. Each of the segments 80 of a given row 84 are of the same size and shape. Selection of a small enough segment size vis-à-vis the projection surface 82 allows illustratively for the use a segment 80 having a trapezoid shape with straight long edges 88 and short edges 90 without loss of resolution. When the segments 80 are attached to the support 76 comprising the convex outer surface 78 the resultant projection surface 82 is formed. In a particular embodiment the long edges 88 of the segments 80 can be slightly curved to snugly fit with adjacent segments 80 of the same size in the same row 84 and the short edges 90 of the segments 80 can be slightly curved to snugly fit with adjacent segments 80 of different size in the same column 86.

Figure 6B:
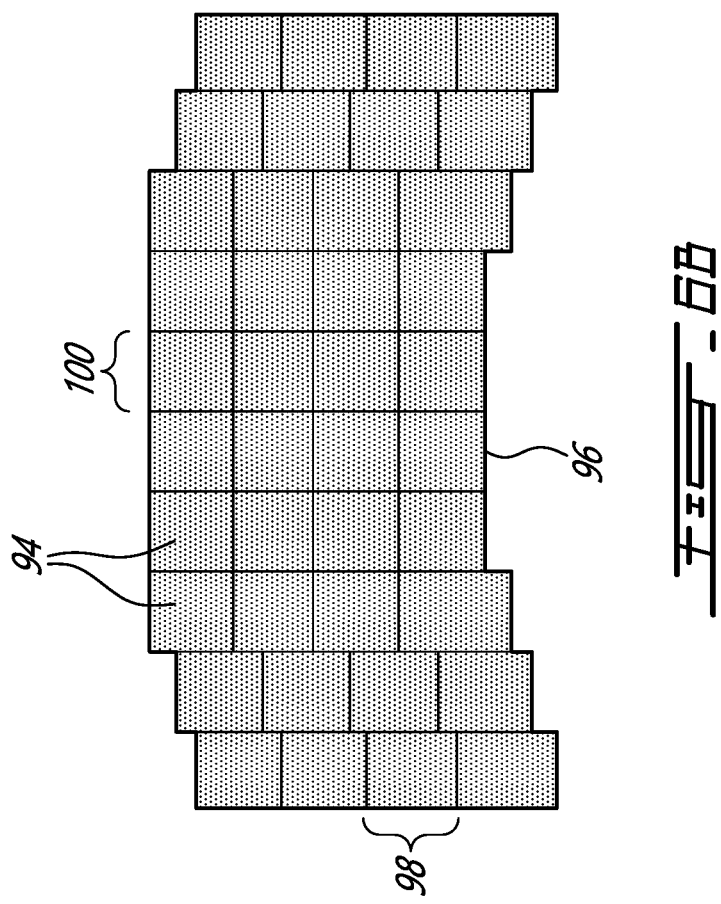
FIG. 6B provides a plan view of a segment layout for a projector in accordance with a fourth illustrative embodiment of the present invention.
Figure 6A:
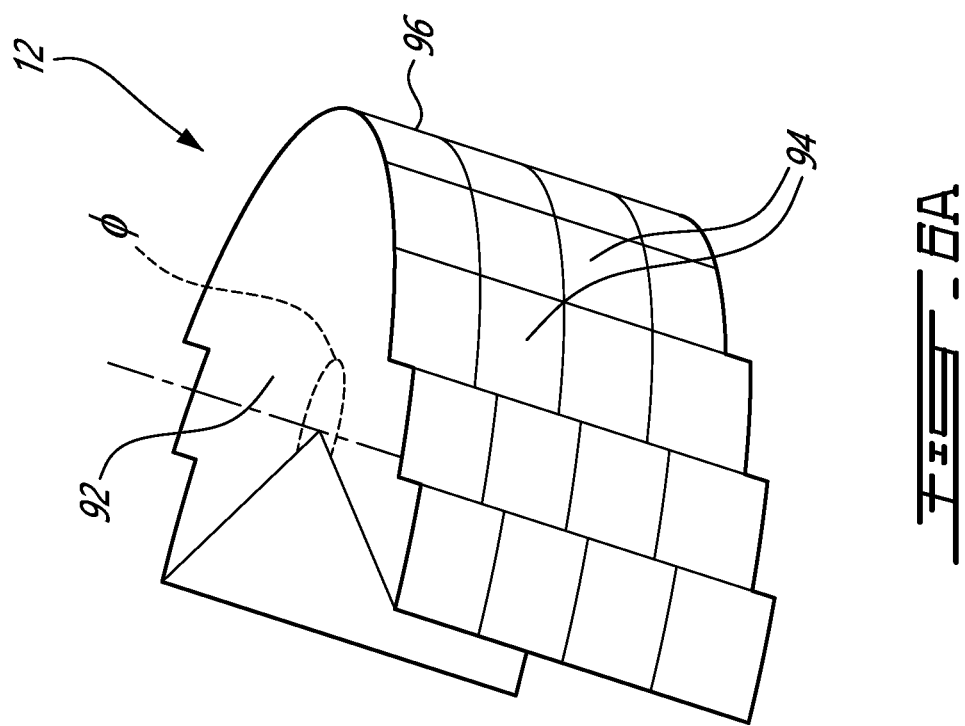
FIG. 6A provides a raised right side perspective view of a projector for a simulator projection system in accordance with a fourth illustrative embodiment of the present invention.

Referring now to FIG. 6A, in a fourth embodiment the projector 12 comprises a projector support or form 92, illustratively fabricated from a ferrous metal such as sheet steel or the like or a composite material such as glass fiber or carbon fiber in a polymer matrix or the like, comprising a smooth cylindrical outer surface onto which a plurality of flexible segments 94 are tiled to form a cylindrical projection surface 96. The convex projection surface 96 spans an angle φ of circa 220° field of view.

Referring now to FIG. 6B in addition to FIG. 6A, in order to form the cylindrical projection surface 96, the segments 94 are laid out in a plurality of rows 98 and columns 100. Each of the segments 94 is illustratively of rectangular shape and of equal size. When the segments 94 are attached to the support 92 comprising the cylindrical outer surface the resultant projection surface 96 is formed.

Referring back to FIG. 1 in addition to FIG. 6A, when installed as part of the simulator projection system 10 the cylindrical projection surface 96 is angled downwards, illustratively at an angle of 12.5 degrees to the vertical and such that it aligns correctly with the collimating reflector 18.

Referring to FIG. 7, each of the segments 30, 58, 80, 94 which make up the projection surface 14 comprises an input 102, such as an HMDI Input, which is connected to an image generator 104. In this regard, a portion of the overall image is illustratively rendered on each of the segments 30, 58, 80, 94. The image generator 104 comprises graphic processing hardware 106 and software stored in memory 108 for generating a live motion view of a simulated space from a selected one of a plurality of virtual locations within the simulated space. The live motion view comprises a series of images 110 which are rendered onto each of the segments 30, 58, 80, 94 of the projector 12, illustratively at 60 frames per second (FPS) and with an image resolution which matches that of the segments, as discussed above, illustratively of 4K.

Still referring to FIG. 7, the images 110 are reflected by the smooth concave mirrored projection surface 20 and visible by an operator 112 seated in an operator position 114, illustratively comprising a chair 116 and a controller 118. The virtual location within the simulated space is selected by the operator 112 illustratively by moving the at least one controller 118.

Referring back to FIG. 1 in addition to FIG. 7, the collimating reflector 18 further comprises a reflector support 120 comprising a smooth concave support surface 122 onto which the smooth concave mirrored surface 20 is adhered. Illustratively the smooth concave support surface 122 is fabricated from a plurality of smaller surfaces 126 which are secured together. Illustratively, the smooth concave mirrored surface 20 comprises a reflective mylar sheet which is held onto the smooth concave support surface 122 by a source of suction (not shown). The projector 12 is illustratively positioned such that the projection surface 14 comprising the flexible segments 30, 58, 80, 94 is positioned above and in front of the operator 44.

Referring to FIG. 8 in addition to FIG. 7, the operator 112 is typically positioned within a mock-up 124 of the vehicle being simulated, illustratively an aircraft. The mock-up 124 includes features such as windows or windscreens 126 through which the operator looks to view the live motion view of the simulated space which is rendered on the projector 12 and reflected by the collimating reflector 18.

Referring now to FIG. 9 in addition to FIG. 1, the projection system 10 can be assembled together with the collimating reflector 18 and the mock-up 124 within an enclosed simulator housing 128. Additional simulation elements such as a parallel manipulator 130 or the like can be included in order to simulate movement, for example.

Mounting the flexible light emitting element segments 30, 58, 80, 94 together to form the projection surface 14 provides for high contrast, no backlight, as well as significantly reducing light pollution during nighttime visual scenes. Additionally, enhanced realism of the night sky is achieved which allows, for example, a pilot operator 112 to simulate navigation using stars. Also, other phenomena such as lightning strikes, red sky, the milky way and northern lights can be simulated. Furthermore, as the assembly provides for no blend zones between overlapping projected images, clarity of lights on runways is improved, for example versus raster images which are currently used with projectors coupled with a back projection screen.

Although the present invention has been described hereinabove by way of specific embodiments thereof, it can be modified, without departing from the spirit and nature of the subject invention as defined in the appended claims.

The invention claimed is:

1. A projector system for use in a simulator comprising an operator position comprising a chair and at least one controller and an image generator for generating a view of a simulated space from a selected one of a plurality of virtual locations within the simulated space and wherein the selected virtual location is selectable by an operator using the at least one controller, the projector system comprising:
   a display comprising a plurality of light emitting elements arranged conforming to a curved surface to form a curved projector surface, wherein said display comprises a plurality of flexible segments arranged side by side, wherein each of said segments comprises an array of said light emitting elements arranged on a first projecting surface thereof; and
   a collimating reflector comprising a smooth concave mirrored surface, wherein the display is oriented toward the concave mirrored surface of the collimating reflector;
   wherein said mirrored surface is positionable relative to said projector surface and the operator such that when the view of the simulated space is rendered on said projector surface and reflected by said mirrored surface, said reflected rendered view is visible by the operator and wherein the operator's perception of an operator position in the simulated space virtually positions the operator position at the selected virtual location.

2. The projector system of claim 1, wherein each of said flexible segments comprises a soft flexible backing, each of said light emitting elements comprises a coloured light-emitting diode (LED) embedded in said soft flexible backing, said flexible segment further comprising electronics for controlling each of said LED.

3. The projector system of claim 1, wherein said plurality of flexible segments are arranged conforming to one of a cylindrical surface to form a cylindrical curved projector surface, a conical surface to form a conical curved projector surface, or a convex surface to form a convex curved projector surface.

4. The projector system of claim 1, wherein said plurality of flexible segments are square and arranged conforming to one of a cylindrical surface to form a cylindrical curved projector surface or a conical surface to form a conical curved projector surface.

5. The projector system of claim 1, wherein said plurality of flexible segments are arranged conforming to one of a conical surface to form a conical curved projector surface or a convex surface to form a convex curved projector surface and further wherein said projector surface is comprised of at least one row of said flexible segments and further wherein each segment of a given one of said at least one row is of a like size and shape.

6. The projector system of claim 5, wherein each of said plurality of flexible segments comprises a trapezoid.

7. The projector system of claim 1, further comprising a projector support comprising a curved outer surface and said display is arranged over and conforming to said curved outer surface to form said curved projector surface.

8. The projector system of claim 1, further comprising a projector support comprising a curved outer surface fabricated from a sheet of a ferrous metal and further wherein each of said segments comprises a plurality of magnets on a second securing surface thereof.

9. The projector system of claim 1, further comprising a projector support comprising one of a cylindrical outer surface, a conical outer surface and a convex outer surface and said flexible display is arranged over and conforming to said outer surface to form respectively a cylindrical curved projector surface, a conical curved projector surface or a convex curved projector surface.

10. The projector system of claim 1, wherein said light emitting elements comprise one of Light Emitting Diodes (LEDs), Organic Light Emitting Diodes (OLEDs) or micro-LEDs.

11. A system for simulating the operation of a vehicle by an operator in a simulated space, comprising:
   an operator position comprising a chair and at least one controller;
   an image generator for generating a view of the simulated space from a selected one of a plurality of virtual locations within the simulated space, wherein said selected virtual location is selectable by the operator using said at least one controller;
   a projector comprising a display conforming to a curved outer surface to form a curved projector surface, wherein said display comprises a plurality of flexible segments arranged side by side, wherein each of said segments comprises an array of said light emitting elements arranged on a first projecting surface thereof; and
   a collimating reflector comprising a smooth concave mirrored surface, wherein the display is oriented toward the concave mirrored surface of the collimating reflector;
   where said convex projector surface is positioned relative to said mirrored surface and said projector surface is positioned relative to said operator position such that when said view of the simulated space is rendered on said projector surface and reflected by said mirrored surface, said reflected rendered view is visible by the operator when seated in said operator position and wherein the operator's perception of an operator position in the simulated space virtually positions the operator position at the selected virtual location.

12. The system of claim 11, wherein said plurality of flexible segments are arranged conforming to one of a cylindrical surface to form a cylindrical curved projector surface, a conical surface to form a conical curved projector surface or a convex surface to form a convex curved projector surface.

13. The system of claim 11, further comprising a projector support comprising an outwardly curved outer surface and said display is arranged over and conforming to said outwardly curved outer surface to form said outwardly curved projector surface.

14. The system of claim 11, wherein the vehicle comprises a fixed wing aircraft, the operator comprises a pilot and said at least one controller comprises one of a control yoke, a centre stick or a sidestick and rudder pedals.

15. A method of projecting an image representing a view of a simulated space for viewing by an operator seated at an operator position comprising at least one controller, comprising:

arranging a display comprising a plurality of light emitting elements arranged conforming to an outwardly curved projector surface;

positioning a collimating reflector comprising a concave mirrored surface relative to said curved projector surface such that the image when rendered on said curved projector surface is visible to the operator when located at the operator position, wherein said display comprises a plurality of flexible segments arranged side by side, wherein each of said segments comprises an array of said light emitting elements arranged on a first projecting surface thereof and wherein the display is oriented toward the concave mirrored surface of the collimating reflector;

generating a view of the simulated space from a selected one of a plurality of virtual locations within the simulated space wherein said selected virtual location is selectable by the operator using the at least one controller, and rendering said view on said outwardly curved projector surface;

wherein the operator's perception of an operator position in said simulated space virtually positions said operator position at said selected virtual location.

16. The method of claim 15, further comprising the operator selecting one of said plurality of virtual locations using the at least one controller.

* * * * *